United States Patent Office 3,631,119
Patented Dec. 28, 1971

3,631,119
REMOVAL OF CARBONYLS FROM
POLYMERIZABLE MONOMERS
Donald M. Haskell, Bartlesville, Okla., assignor to
Phillips Petroleum Company
No Drawing. Filed Jan. 8, 1970, Ser. No. 1,555
Int. Cl. C07c 5/18, 7/00
U.S. Cl. 260—681.5       6 Claims

ABSTRACT OF THE DISCLOSURE

Carbonyl compounds are removed from a butadiene-containing stream by contacting the stream with formamide.

FIELD OF THE INVENTION

This invention relates to the removal of impurities from polymerizable monomers. In another aspect, it relates to decreasing the amount of carbonyl impurities associated with 1,3-butadiene. Throughout the specification and claims the term "carbonyls" refers to compounds containing a ($>C=O$) group which includes organic acids, aldehydes and ketones. Exemplary compounds are furans, furfural, acetaldehyde, acetic acid, methylacetate, and the like.

DESCRIPTION OF THE PRIOR ART

It is well known in the art of polymerizing 1,3-butadiene that excessive amounts of carbonyls associated with 1,3-butadiene monomer feed function as a polymerization catalyst poison. Accordingly, the art has devised various means of removing these carbonyl compounds from the monomer prior to subjecting the monomer to polymerization conditions. Normally, the removal of carbonyls is effected during the monomer purification step and results in increased catalyst life with regard to the polymerization catalyst. Recently, the preparation of 1,3-butadiene has been accomplished by the use of the so-called oxidative dehydrogenation process. This process involves the contact of butenes with a suitable oxidative dehydrogenation catalyst in the presence of air or other oxygen-containing gas (and optionally steam), thereby providing an increased conversion of the butenes to the desired 1,3-butadiene. Although this process has resulted in increased production in the amount of 1,3-butadiene with respect to the amount of butenes charged to the oxidative dehydrogenation catalytic reactor, it has also resulted in an increase in the amount of carbonyl impurities which are present within the dehydrogenation reactor effluent.

Systems have been developed to separate the 1,3-butadiene product from the effluent of the dehydrogenation reactor which results in removal of certain amounts of the carbonyl impurities. As part of the separation process, it is still advantageous to employ furfural to selectively extract the 1,3-butadiene from the unreacted butenes. Because of the use of furfural and the increase in the amount of carbonyls which are present in the effluent from the dehydrogenation reactor, it has become increasingly necessary to find a method of removing from the 1,3-butadiene stream the carbonyl impurities prior to subjecting the 1,3-butadiene to polymerization reactions. Some consumers who utilize the 1,3-butadiene as a polymerization monomer require that the carbonyl content of the 1,3-butadiene be less than 10 p.p.m.

OBJECTS OF THE INVENTION

It is an object of the invention to remove carbonyl contaminants from 1,3-butadiene.

Other objects and advantages of the invention will become apparent to those skilled in the art from a reading of the description of the invention and the claims.

SUMMARY OF THE INVENTION

The process of the invention comprises contacting a stream which contains substantial amounts of 1,3-butadiene and which also contains carbonyl impurities with formamide, thereby effecting a reduction in the carbonyls and rendering the 1,3-butadiene stream substantially free of carbonyl impurities.

DESCRIPTION OF THE INVENTION

The removal of the carbonyl impurities is accomplished by subjecting a stream containing substantial amounts of 1,3-butadiene (such as the effluent from the reactor in the oxidative dehydrogenation process of butene) to contact with formamide (formic acid amide). The stream containing the 1,3-butadiene and carbonyl impurities can be vaporized prior to contact with the liquid formamide. In addition, intimate association of the 1,3-butadiene containing stream and liquid formamide can be made in a suitable liquid-liquid contacting apparatus.

The formamide utilized can be prepared by any suitable method, such as by reacting methyl formate with ammonia under pressure and separating the product formamide from by-product methanol by distillation, Encyclopedia of Chemical Technology, by Kirk-Othmer, 2nd edition, vol. 10, p. 105, Interscience Publishers, New York. The formamide does not have to be in a pure or reagent grade condition to be used in the invention. However, it is preferable that other materials associated with the scrubbing liquid be substantially insoluble in butadiene and do not function as polymerizable inhibiters or polymeriztaion catalyst poisons. The liquid formamide can be employed by itself, or it can be employed as an aqueous solution. Any amount of formamide above about 1% by weight can be used to form the water solution. Additionally, water can be associated with the formamide in less than major amounts of volume or weight. When using an aqueous solution of formamide, it is within the scope of the invention to adjust the concentrations of formamide and water to efficiently remove carbonyls in the 1,3-butadiene stream with respect to the ability of the contact device to effect sufficient contact between the reagent and the carbonyls.

When the butadiene stream is vaporized the invention contemplates passing the vaporized stream to a suitable apparatus where in it is brought into contact with the liquid formamide. The 1,3-butadiene stream is heated to its boiling temperature of about 25° F. under atmospheric pressure. The vaporized 1,3-butadiene is then passed to a liquid-gas contacting column wherein the vaporized stream of 1,3-butadiene is introduced into the lower portion of the column and the liquid formamide is introduced to the upper portion of the column. As the vaporized butadiene rises through the column, it contacts the scrubbing liquid which falls through the packing, or trays of the column, thereby effecting sufficient surface area contact of the vaporized 1,3-butadiene stream and that of the reagent.

When employing either the liquid-liquid or vapor-liquid contact of the 1,3-butadiene stream and the reagent, the only requirement with regard to the dimensions of the contacting apparatus is that a sufficiently large contact area be provided for the association of the monomer stream and the scrubbing material. The amount of 1,3-butadiene charged to the column may be regulated to provide maximum association of formamide and the 1,3-butadiene. Accordingly, the charge rate can be dictated by the analysis of the resulting 1,3-butadiene product. In other words, the purified 1,3-butadiene exiting the upper portion of the column may be analyzed periodically or automatically to determine carbonyl content and the charge rate of the 1,3-butadiene flowing to the column may be adjusted accordingly. If it is found that the carbonyl concentration is too high, the charge rate can be slowed, thereby effecting an increase in the ability of the reagent to absorb the carbonyl impurities. If the analysis of the 1,3-butadiene product stream shows that the carbonyl content is below a specified level, thereby indicating an incomplete utilization of the reagent to remove the carbonyl impurities the throughput can be increased, thereby effecting a more efficient utilization of the formamide.

When using vapor-liquid contact or liquid-liquid contact, the heating of the 1,3-butadiene stream and passage into the column may be effected at above atmospheric pressures if desired. Generally, the pressures which will be employed will be in the range of from 15 to 100 p.s.i.a. The formamide can be heated to a temperature range of 25 to 135° F., depending upon the pressure within the contacting apparatus, prior to being introduced to the upper portion of the column. Of course, when using the aqueous solution of formamide, it should not be heated to such a temperature as to result in the vaporization of the solution. The aqueous solution of formamide or formamide alone is removed at the lower portion of the column in a liquid phase. It is preferred to maintain formamide reagent content of the aqueous solution at a minimum level in order to efficiently utilize the amounts of formamide present in the aqueous solution to scrub out the carbonyls. It is understood that when liquid-liquid contact of the butadiene containing carbonyls is utilized, the scrubbing solution and the butadiene stream can be heated to temperatures below their respective boiling points.

It is preferred that the introduction of the formamide reagent to the column at the upper portion thereof be of a constant value for the ease of operation and maintenance of the column. The amount of 1,3-butadiene which is passed to the column can be regulated in response to the analysis of the 1,3 - butadiene exiting the column, the analysis indicating carbonyl concentration.

The results of the invention are illustrated in the following example which is presented to show the effectiveness of the formamide in removing carbonyl contaminants from a stream of 1,3-butadiene. It is understood that the data presented in the example is for the purpose of illustrating the invention, and it should not be construed as limiting the scope of the invention.

EXAMPLE

Equal parts by weight of reagent grade formamide and butadiene were shaken to demonstrate a single stage liquid-liquid contact of the reagent and 1,3-butadiene. The test was carried out at room temperature (about 70° F.) under the vapor pressure of butadiene, about 25 p.s.i.g. Carbonyl concentration of the 1,3-butadiene was determined according to the procedure of ASTM D-1089-59 before and after contact with the reagent.

Prior to contact with formamide the concentration of carbonyls was 990 p.p.m. After contact with formamide, the concentration of carbonyls was 129 p.p.m. Since equal parts by weight of the reagent and butadiene were employed, it is easily calculated that the approximate selectivity of the formamide for carbonyls over butadiene is 990-129/129=6.6.

Because of the high selectivity of the reagent for carbonyls, in commercial operation only a few stages would be required to effect essentially complete removal of these impurities. Thus, a contact tower containing packing or trays which are equivalent to ten stages easily reduces the concentration of carbonyls to less than 10 p.p.m. as required by some consumers.

Accordingly, the invention as disclosed herein contemplates the removal of carbonyl impurities (acids, aldehydes, and ketones) from a stream of 1,3-butadiene, by contacting the 1,3-butadiene stream with formamide. The contact of the 1,3-butadiene and formamide results in a decrease in concentration in the carbonyls thereby rendering the 1,3-butadiene monomer suitable for polymerization purposes.

Reasonable variations and modification of my invention are possible without departing from the spirit and scope of the invention.

I claim:
1. A method of reducing the concentration of carbonyls in a stream comprising 1,3-butadiene, said method comprising contacting the 1,3-butadiene stream with formamide.

2. A method according to claim 1 wherein said formamide is diluted with water prior to contact with the 1,3-butadiene.

3. A method according to claim 2 wherein the 1,3-butadiene stream is vaporized prior to contact with the aqueous solution of formamide.

4. A method according to claim 1 wherein the contact of formamide and the vaporized stream comprising 1,3-butadiene is accomplished in a packed liquid-liquid column by introducing the butadiene stream into the lower portion of the column and introducing the formamide in the liquid phase into the upper portion of the column, thereby effecting contact of formamide with the carbonyls present in the stream comprising 1,3-butadiene.

5. A method according to claim 1 wherein the 1,3-butadiene stream contains less than 1000 parts per million concentration of carbonyls.

6. A method according to claim 4 wherein the concentration of carbonyls present in the 1,3-butadiene after contact with the formamide is less than 10 p.p.m.

References Cited

UNITED STATES PATENTS

| | | | |
|---|---|---|---|
| 2,261,799 | 11/1941 | Franklin | 208—321 |
| 2,418,183 | 4/1947 | McCombie et al. | 260—681.5 C |
| 2,460,056 | 1/1949 | Yowell et al. | 260—681.5 R |
| 3,075,025 | 1/1963 | Henke et al. | 260—681.5 R |

DELBERT E. GANTZ, Primary Examiner

G. E. SCHMITKONS, Assistant Examiner

U.S. Cl. X.R.

260—680, 683.3; 208—321, 330